US010299592B2

(12) United States Patent
Goerges et al.

(10) Patent No.: US 10,299,592 B2
(45) Date of Patent: May 28, 2019

(54) CHANNEL TUBE AND TUBE NUT FRAMING APPARATUS

(71) Applicants: Brian M. Goerges, Nisswa, MN (US); Matthew C. Goerges, Pequot Lakes, MN (US)

(72) Inventors: Brian M. Goerges, Nisswa, MN (US); Matthew C. Goerges, Pequot Lakes, MN (US)

( * ) Notice: Subject to any disclaimer, the term of this patent is extended or adjusted under 35 U.S.C. 154(b) by 697 days.

(21) Appl. No.: 15/068,671

(22) Filed: Mar. 14, 2016

(65) Prior Publication Data

US 2016/0262541 A1 Sep. 15, 2016

Related U.S. Application Data

(60) Provisional application No. 62/133,452, filed on Mar. 15, 2015.

(51) Int. Cl.
*A47B 96/14* (2006.01)
*F16B 37/04* (2006.01)
*A47B 47/00* (2006.01)
*F16B 12/44* (2006.01)

(52) U.S. Cl.
CPC ...... *A47B 96/1408* (2013.01); *A47B 47/0016* (2013.01); *F16B 12/44* (2013.01); *F16B 37/045* (2013.01)

(58) Field of Classification Search
CPC ... A47B 47/0008; A47B 47/0016; E04B 1/19; E04B 1/1912; E04B 1/2403; E04B 1/5831; E04B 1/5837; F16B 17/00; F16B 12/32; F16B 7/04; F16B 7/18; F16B 7/0446

See application file for complete search history.

(56) References Cited

U.S. PATENT DOCUMENTS

| | | | |
|---|---|---|---|
| 576,939 A | 2/1897 | Baines | |
| 2,345,650 A | 10/1940 | Attwood | |
| 3,547,475 A * | 12/1970 | Gingher | F16B 7/0413 285/397 |
| 3,847,489 A * | 11/1974 | Van Riper | A47B 57/54 211/207 |
| 4,105,348 A * | 8/1978 | Anderson | F16B 7/0446 211/182 |
| 4,278,361 A | 7/1981 | Steinke | |
| 4,408,928 A * | 10/1983 | Steinke | F16B 7/0446 403/320 |
| 4,473,178 A * | 9/1984 | Bott | B60R 9/045 224/321 |

(Continued)

*Primary Examiner* — Daniel J Wiley
(74) *Attorney, Agent, or Firm* — David George Johnson

(57) ABSTRACT

A mechanical framework (168, 187) is formed with a basic tube nut (1, 63) and channel tube (124, 137) geometry. A threaded faster (170) is used to attach the elements. Orthogonal elements can be strengthened by an angle bracket (163) and nut plate (168). The edges (126) of the channel tube (124) are scalloped by a series of indentations (129, 130) which engage the fastener (170) and resist rotation of the tube nut (1, 63) within the channel tube (124, 137). Additional tube nuts (82, 100) provide an additional single flange (87) and pair of flanges (101, 102) respectively. The tube nut (1, 63) includes a turret (2) that fits between guide rails (152, 153) so as to form a continuous planar surface when mounted within the channel tube (124, 137).

14 Claims, 14 Drawing Sheets

(56) References Cited

U.S. PATENT DOCUMENTS

| | | | | |
|---|---|---|---|---|
| 4,488,844 | A * | 12/1984 | Baubles | F16B 37/045 411/103 |
| 4,790,701 | A * | 12/1988 | Baubles | F16B 37/044 411/107 |
| 5,157,883 | A * | 10/1992 | Meyer | E04B 2/766 24/460 |
| 5,713,651 | A * | 2/1998 | Essig | F16B 12/50 312/265.4 |
| 6,010,144 | A * | 1/2000 | Breslin | B60D 1/155 280/491.5 |
| 6,974,276 | B2 * | 12/2005 | Kirchner | A47B 57/54 403/385 |
| 8,225,581 | B2 * | 7/2012 | Strickland | E04C 3/07 52/481.1 |
| 9,121,433 | B1 * | 9/2015 | Bacon | F16B 37/045 |
| 9,848,697 | B2 * | 12/2017 | Eichelberger | B64C 7/00 |
| 2005/0034390 | A1 * | 2/2005 | Dubensky | E04B 1/3483 52/220.1 |
| 2013/0256251 | A1 * | 10/2013 | Oboza | H02B 1/014 211/182 |

\* cited by examiner

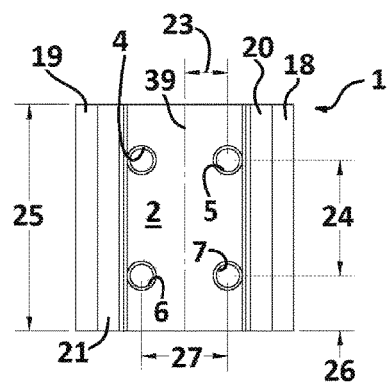
FIGURE 2
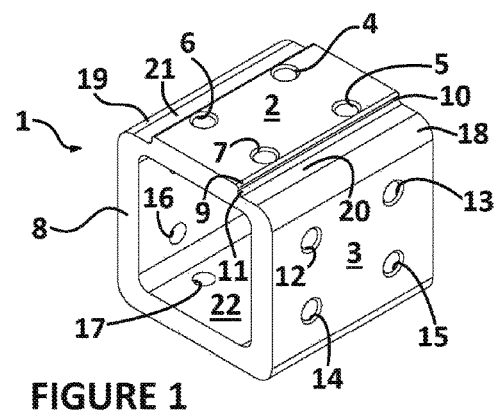
FIGURE 1
FIGURE 4
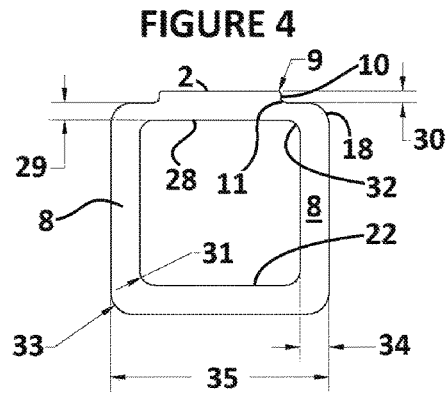
FIGURE 3
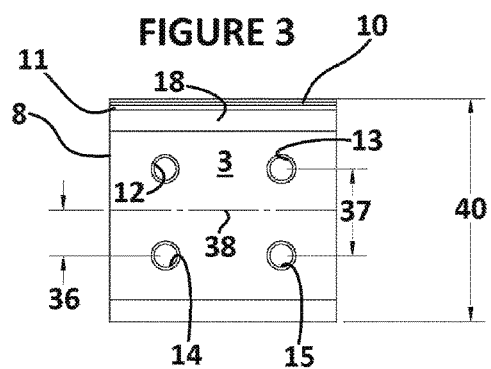

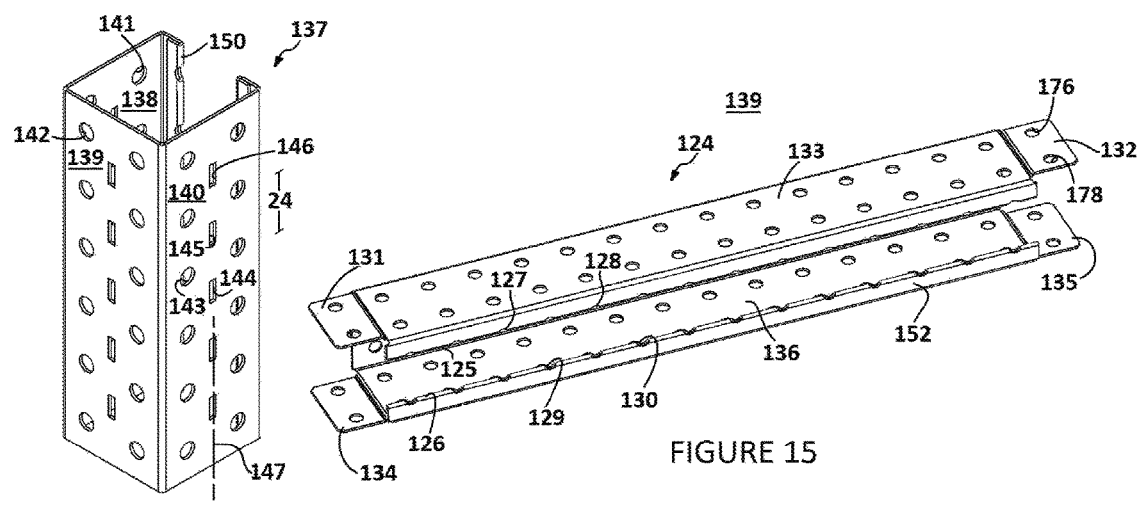

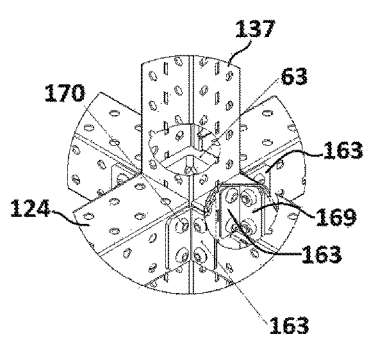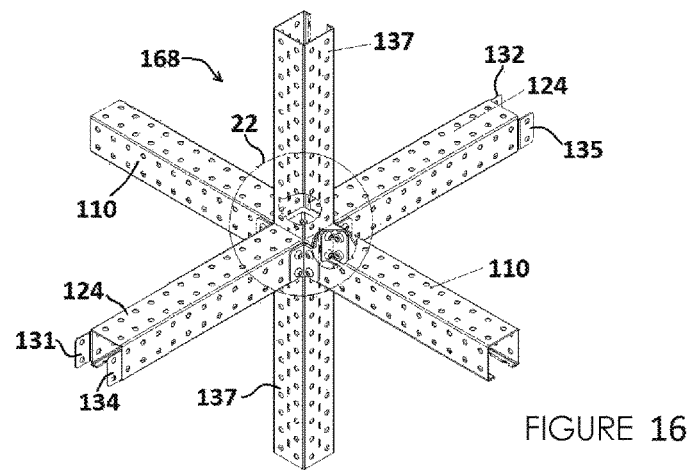
FIGURE 22
FIGURE 16

US 10,299,592 B2

CHANNEL TUBE AND TUBE NUT FRAMING APPARATUS

This patent application derives priority from provisional patent application Ser. No. 62/133,452, filed on Mar. 15, 2015.

TECHNICAL FIELD

The present invention pertains generally to the field of fasteners, and more particularly to generic structural members that may be easily formed into desired objects with a generic fastener.

DESCRIPTION OF RELATED TECHNOLOGY

A mechanical framework is the basic structural element of many common items such as a table, wall, desk, shelf or partition. These items have been well known for centuries, and the variety of designs, construction methods, materials and dimensions is vast. In an industrial setting, the workspace presents a large number of nonstandard floor layouts and tasks to be accomplished, and so necessarily no single collection of tools, storage bins, work surfaces and shop layouts can possibly satisfy every possible production environment.

In other words, a desk or shelf, for example, may be needed to fit into a specific space in a room, and that desk or shelf must therefore have certain dimensions. The dimensions needed may not be available in any existing product, thereby requiring the construction of a specific desk or shelf having a custom shape and size. Frequently the shelf or desk may be needed only temporarily, or may need to be relocated to a different location having different space requirements. In that case, the shelf or desk must either be replaced, or must be resized in some convenient manner.

Typically, a desk or shelf of some standard size is used in the workplace, resulting in wasted space or other inconvenience because that is a more economical solution than constructing custom furnishings to accommodate each specific situation as it arises. Many attempts have been made in the past to create some sort of universal or modular construction system that will permit frameworks of various shapes and sizes to be readily constructed and reconstructed as needed.

For example, U.S. Pat. No. 576,939, entitled "Adjustable Shelf Bracket", utilizes a standard channel having a predetermined known shape to permit the relocation of a bracket element. U.S. Pat. No. 2,345,650 entitled "Skeletonized Structure" uses a channel that accommodates a biased nut to permit infinite repositioning of the nut within the channel. The biased nut is retained by two tabs formed as a part of the channel U.S. Pat. No. 4,278,361 entitled "Channel Interconnection Apparatus" discloses a dimpled nut that interacts with a serrated channel, the nut engaging a screw that passes through holes placed in between the serrations.

The need remains for a simple generic channel and nut assembly that may be easily manufactured, and readily configured and reconfigured in the field to create frameworks having any desired geometry or dimensions.

BRIEF DESCRIPTION OF THE DRAWINGS

FIG. 1 is an isometric view of a tube nut constructed according to the principles of the present invention;

FIG. 2 is a top plan view of the tube nut illustrated in FIG. 1;

FIG. 3 is a side elevation view of the tube nut illustrated in FIG. 1;

FIG. 4 is an end elevation view of tube nut illustrated in FIG. 1;

FIG. 14 is an isometric view of a third embodiment of a channel tube constructed according to the principles of the present invention;

FIG. 15 is an isometric view of a fourth embodiment of a channel tube including two pairs of flanges constructed according to the principles of the present invention;

FIG. 16 is an isometric view of a framework joint constructed according to the principles of the present invention;

FIG. 22 is a detailed view of the region 22 depicted in FIG. 16;

SUMMARY OF THE INVENTION

Figure 5:
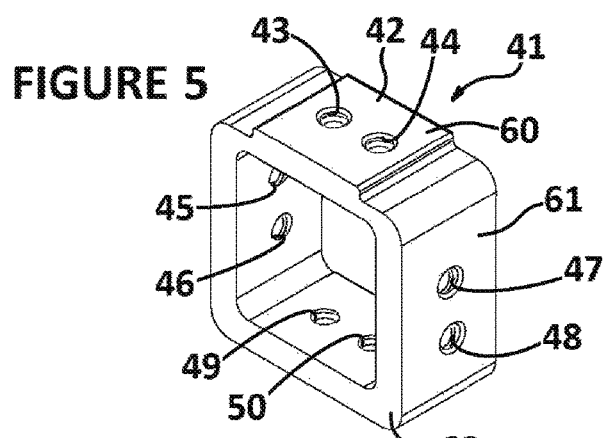
FIG. 5 is an isometric view of a second embodiment of a tube nut constructed according to the principles of the present invention.
Figure 6:
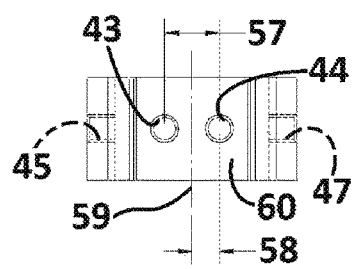
FIG. 6 is a top plan view of the tube nut illustrated in FIG. 5.
Figure 7:
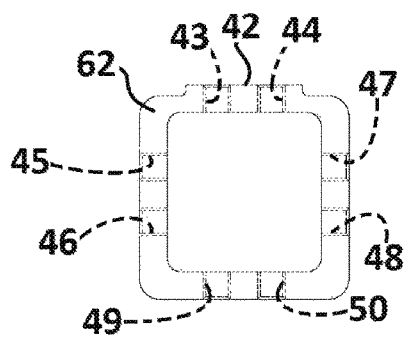
FIG. 7 is an end elevation view of tube nut illustrated in FIG. 5.
Figure 8:
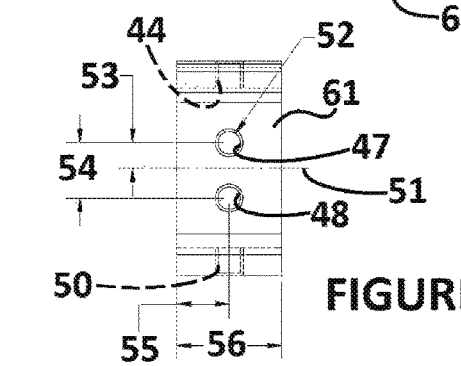
FIG. 8 is an end elevation view of tube nut illustrated in FIG. 5.

The present invention addresses frame construction, accessory mounting and unitized manufacturing. The present invention discloses a simpler standardized way to construct a mechanical frame work that can fit many applications including tables, enclosures, shelving, desks, benches, stands, continuous counter tops and cabinets, sporting enclosures, trailer enclosures, general enclosures, barriers, wall racking, and nonbearing walls. The present invention includes components that allow the end user to select an existing frame design or to select components that create a unique design. The present invention permits the end user to alter existing frame work, adding, subtracting or rearranging features as necessary.

Commercially available materials and hardware may be readily added to the unitized platform of the present invention. The present invention includes a channel tube constructed of sheet metal and shaped as a four sided tube with a channel opening. The corresponding connector is a channel nut that fits the inside cross sectional shape in a precise fashion along with fasteners applied from the outside of the channel. The channel and fasteners of the present invention provide a uniform method of making frame work based on an equal unit of measure (EUM) for the length, width and height of a mechanical frame such as, for example a 1"×1"×1" channel. Because of this novel approach to framing, engineering values can be systematically assigned to the framing structures and their components to simplify frame design and manufacture.

The assembly of the channel nut and the fastener can create the strength of a welded joint. The fastener of the present invention combines a clamping surface and a locating shoulder that engages both the channel nut and channel itself, thereby transferring the shear load from the channel members through the fitment of the mating hole surfaces to the locating shoulder and finally to the mating socket on the tube nut.

The present invention includes a variety of channel tubes with the same standard patterns of spaced apart holes which can be used as both vertical and horizontal channels. Other structural members can be formed to include flanges for creating connection surfaces at the ends of the channel tube.

Construction of the framework is dependent on the pattern and spacing of holes which allows for standard increments of frame fitment and sizing. This provides a standardized way to attach other components properly to the frame work without having to add additional holes. The present invention results in reduced planning and lead time while requiring less material, skill and labor to create the desired object were it to be made by conventional means such as wood framing, welded members or other fastened joint designs.

The present invention simplifies the construction of common frame work applications by reducing the need for saws, drills, hammers, nails, welders, and various other tools, as well as reducing the skills and knowledge needed to construct various sizes of unitized frames to within a value of for example, one cubic inch. The present system promotes the use of a single fastener type further simplifying construction effort, efficiency and quality.

A selection of channels and fasteners constructed according to the principles of the present invention permits erection of a framework with only a rotary driver and a single bit. Typically, the corner frame joint of the present channel tube construction is supported by the channel nut which provides a common connection region for all frame members at the joint. The specialized fastener and channel hole pattern of the present invention support joining up to six channels at a single joint.

The rigidity and strength of the joint area of the channel tube is stronger than the channel itself, which greatly enhances the rigidity of the overall frame work while retaining a simple method of construction. Construction of the channel members is of a relatively light or thin gage of material which nonetheless produces a rigid frame work with relatively less material and energy expended in creating the channel members themselves.

The pattern and spacing of holes, as well as the fastener size used in the channel tube and channel nut permits the fastener and nut to be placed so that the channel side of the channel tube has a pattern of holes that is substantially identical to the pattern holes present on the other sides of the channel. The pattern and spacing of holes in the channel tube allows for standardized components to be made in a unitized system that are compatible to the applied standard increment of channel tube hole spacing. The consistent pattern of holes matches on all sides of the channel tube to permit the mounting of an accessory to the frame work anywhere along the length of the channel without regard to frame work orientation.

The channel tube wall thickness, channel nut thickness, and fastener size are scalable to create different outside dimensions of channel tube to accommodate the strength required to fit a variety of mechanical applications. The perforation of the channel tube and channel nut pattern can be performed along the entire length of the tube or placed in selected locations where the channel nuts and tubes are required for a particular structure. Utilizing the channel tube in this fashion allows for custom design of a framework when encountering nonstandard or customer specific requests for the channel tube and channel nut system of the present invention.

DETAILED DESCRIPTION OF THE INVENTION

Referring generally to FIGS. 1-4, the channel nut 1 of the present invention is formed generally as a substantially rectangular solid having rounded corners, such as outer corners 18 and 19 as well as a corresponding inner corner 32. Each of the corners 19, 20 have an outer radius 33 of approximately 0.19 inch and an inner radius 31 of approximately 0.13 inch. The channel nut includes an interior channel having a floor 22 and a ceiling or upper surface 28. The outer width 35 of the channel 1 is approximately 1.89 inches while the wall thickness 34 is approximately 0.250 inch. The channel nut 1 is substantially rectangular except for a top shelf or turret 2 which extends outwardly from the planar surfaces 21 and 22. Four symmetrically places beveled bores 4, 5, 6 and 7 are formed orthogonally through the plane defined by turret 2. The channel nut 1 includes a substantially planar end surface 8.

The turret 2 includes a radiused corner 9 which joins a substantially vertical wall 10, the wall 10 transitioning to the planar surface 20 via a filleted corner 11. The height 30 of the turret 2 is approximately 0.100 inch. The length 25 of the turret 2 is approximately 1.97 inches. The channel nut 1 includes two opposite sidewalls, such as sidewall 3, which contains four beveled bores 12, 13, 14 and 15. The bores 12-15 are arranged in a pattern and spacing that is substantially identical to the pattern of bores 4-7 formed within the turret 2. Similar bores arranged in a similar pattern appear on each surface of the turret 2, such as bore 16 and bore 17 visible in FIG. 1. The diameter of each bores is approximately 0.201 inch. The longitudinal distance 24 between adjacent bores 12 and 13, or bores 5 and 7, for example, is approximately one inch. The turret 2 includes a longitudinal axis 39. The center of each bore 2, 6 and 5, 7 are each spaced a distance 23 from the axis 39 by a distance of 0.375 inch, resulting in a total bore spacing 27 of 0.750 inch. Sidewall 3 has a parallel longitudinal axis 38. The center of each bore 12, 13 and 14, 15 is spaced a distance 36 from the axis 38 by a distance of 0.396 inch, resulting in a total bore spacing 37 of 0.750 inch. The total width 40 of the channel nut 1 is approximately 1.935 inches.

Referring also to FIGS. 5-8, a second embodiment of a channel nut 41 is formed as a rectangular solid including an upper bench 42 having a planar surface 60. The upper bench 42 includes two threaded bores 43 and 44 which are separated by a distance 57 of approximately 0.500 inch, or a distance 58 of approximately 0.25 inch from the longitudinal axis 59. The rectangular solid includes two opposing sidewalls, such as sidewall 61 which includes threaded bores 47 and 48, also separated by a distance 54 of approximately 0.500 inch, or a distance 53 of 0.250 inch from the longitudinal axis 51. The remaining sidewalls each contain a pair of threaded bores, such as bores 45, 46 and bores 49, 50. The length 56 of channel nut 41 is approximately 0.94 inch, causing the centerline of each bore 47 and 48 to be displaced from the edge of channel nut 41 by a distance 55 of approximately 0.469 inch.

Figure 9:
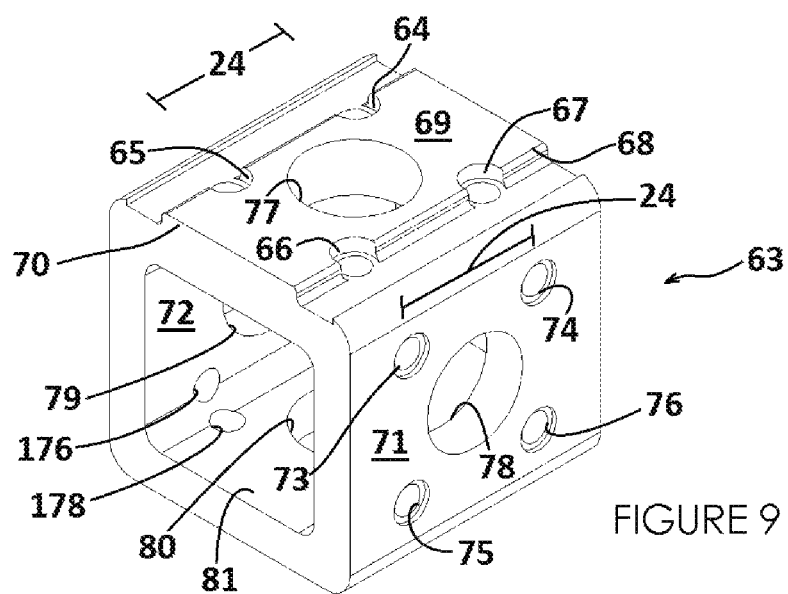
FIG. 9 an isometric view of a third embodiment of a tube nut constructed according to the principles of the present invention.

Referring also to FIG. 9, a third embodiment of a channel nut 63 is shown including four bores 64, 65, 66 and 67 which are formed orthogonally through the planar surface 69 of the upper shelf 70. The opposite sidewalls 71 and 72 support the upper shelf 70, with each sidewall including a plurality of bores, such as bores 73, 74, 75 and 76, which are arranged in a pattern that is substantially similar to the orientation and spacing of bores 64-67. The opposite sidewall includes a threaded bore 176 that is aligned with bore 75. The upper shelf 70 includes an edge 68, through which each of the bores 64-67 pass, with approximately half of each bored 64-67 passing through the planar surface 69. An enlarged bore 77 is formed through upper shelf 70 and is substantially aligned with a similar enlarged bore 80 formed in the bottom surface 81 of the channel nut 69. Similarly, a substantially identical bore 78 passes through the sidewall 71 and is aligned with a matching bore 79 formed in sidewall 72. The threaded bore 178 in the bottom surface 81 is aligned with the bore 65 that passes through the upper shelf 70.

Figure 10:
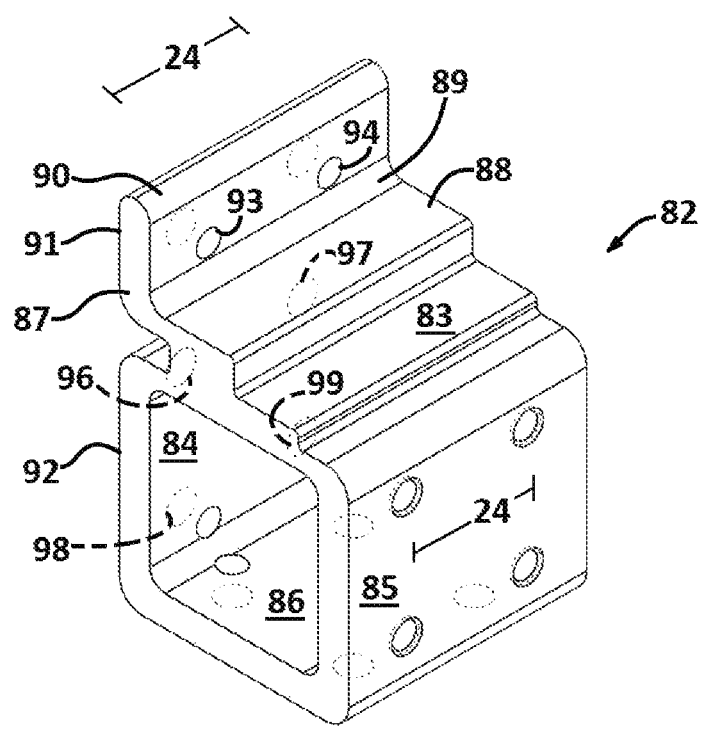
FIG. 10 an isometric view of a fourth embodiment of a tube nut constructed according to the principles of the present invention.

A fourth embodiment of a channel nut 82 is depicted in FIG. 10, which includes a top shelf 83 residing above opposite sidewalls 84 and 85, as well as bottom wall 86. Integrally formed with the top shelf or bench 83 is a flanged bracket 87 that is formed to include a planar base 88 that transitions through fillet 89 to an orthogonal flange 90. The outer planar surface 91 of the orthogonal flange 90 is substantially coplanar with the outer surface 92 of the sidewall 84. A pair of bores 93 and 94 is formed through the orthogonal flange 91 and are spaced apart by the distance 24, which is equal to the spacing between the sidewall bore pairs 96, 97 and 98, 99.

Figure 11:
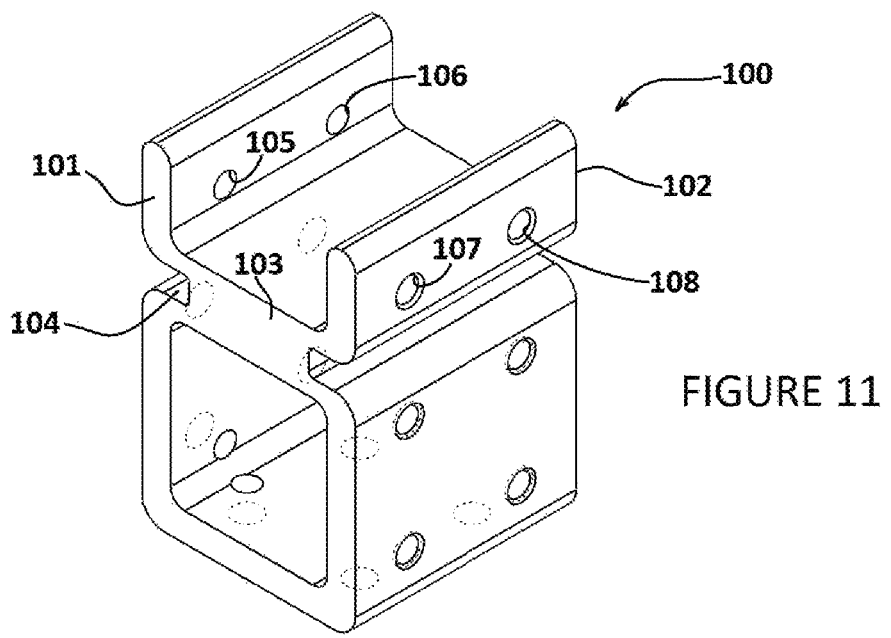
FIG. 11 an isometric view of a fifth embodiment of a tube nut constructed according to the principles of the present invention.

Referring also to FIG. 11, a channel nut 100 containing a pair of orthogonal, upwardly extending flanges 101 and 102 is depicted. The flanges 101, 102 are integrally formed with an enlarged upper shelf region 103 which resides on the top surface 104 of channel nut 100. Flange 101 contains two bores 105 and 106, each of which is aligned with a substantially identical bore 108 and 109, respectively, formed in flange 102.

Figure 13:
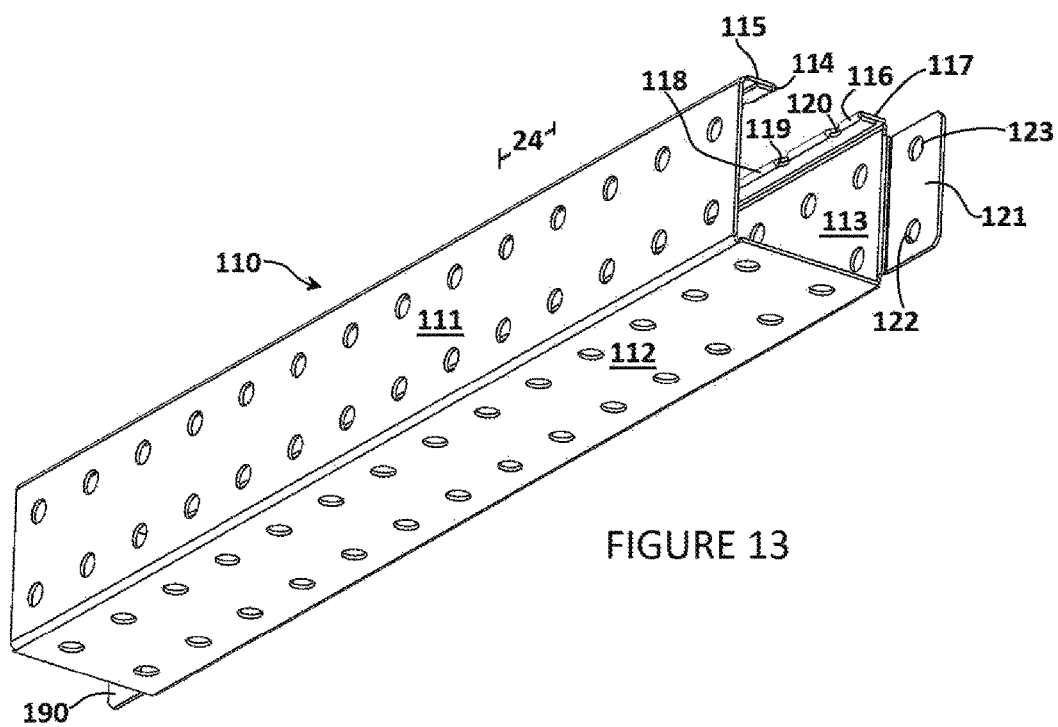
FIG. 13 is an isometric view of a second embodiment of a channel tube including a pair of flanges constructed according to the principles of the present invention.
Figure 17:
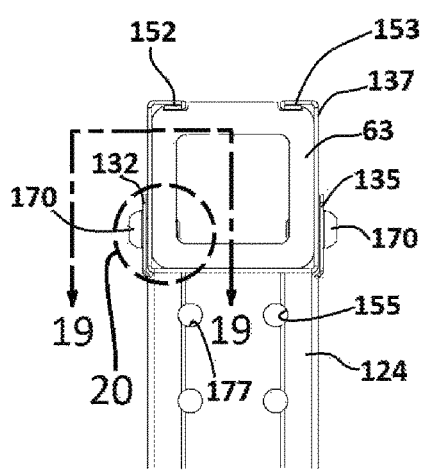
FIG. 17 is an end view of the tube nut depicted in FIG. 4 shown mounted within a channel tube depicted in FIG. 15.
Figure 18:
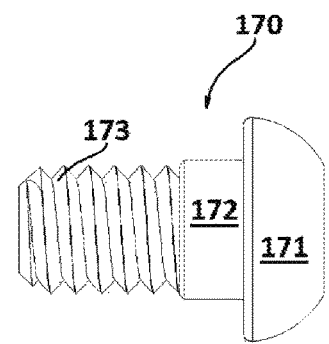
FIG. 18 is a side elevation of a fastener constructed according to the principles of the present invention.

As best seen in FIGS. 13, 14 and 15 the present invention includes a series of channels or channel tubes that, when combined with the previously described channel nuts, can be used to create a variety of useful articles. FIG. 13 depicts an open channel 110 having three sidewalls 111, 112 and 113. The sidewall 111 is formed to include a lower, extended orthogonal edge 114, which creates a surface or platform 115. Similarly, the opposite sidewall 113 is formed to include a lower, extended orthogonal edge 116 which creates a platform or rail 117. Together the two platforms or surfaces 115 and 117 are useful in retaining the aforementioned channel nuts within the open channel 110 when the channel nuts are slidably repositioned. The surface 115 includes an inner edge 118 which is scalloped or perforated by semicircular indentations 119 and 120, for example, which are spaced apart by distance 24 that is equal to the distance 24 between bore holes formed within the channel nuts. In particular, the bores 65-67 of channel nut 63 correspond to the semicircular geometry of the scallops 119 and 120. The channel 110 includes two end flanges 190 and 121 which are useful for interconnecting the channel tube 110 to other similarly configured channels. In particular, the channel nut 63 can be positioned so that bores 64 and 65 overlay the flange bores 122 and 123, respectively, so that the remaining channel nut bores 66 and 67 are free to mate with another channel tube or similarly configured accessory.

FIG. 15 depicts a similar channel tube 124 in which each edge 125 and 126 is seen to include a plurality of scalloped indentations, such as indentations 127, 128, 129 and 130, for example. Channel tube 124 is also seen to include a flange 131 and 132 terminating each end of sidewall 133 and a substantially identical pair of flanges 134 and 135 terminating each end of sidewall 136. An alternate channel tube 137 is depicted in FIG. 14, which includes sidewalls 138, 139 and 140. Edges or guides 150 and 151 form a support for the insertion of a tube nut 63. A plurality of bores, such as bores 141, 142 and 143 appear on each of the sidewalls in a spaced apart pattern that maintains the bore separation distance 24 appearing on channel nut 63, for example. Additionally, a plurality of substantially rectangular slots 144, 145 and 146, for example, are formed along the centerline 147 of each sidewall. The slots 144-147 are useful in anchoring the distal end of a fastener passing through the bores 77 and 80 of channel nut 63, for example, or for engaging a hook, tab or other protrusion that may be present on an accessory to be attached to the channel tube 137. The flange 132 includes a pair of bore holed 176 and 178.

Figure 12:
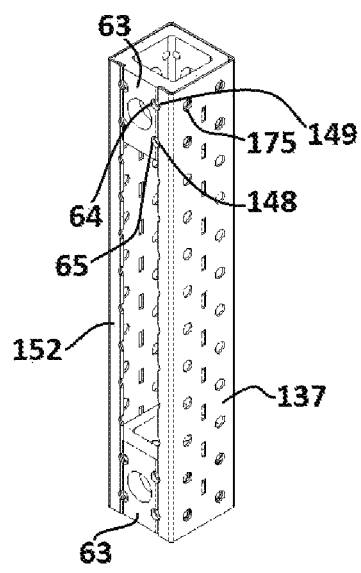
FIG. 12 is an isometric view of a channel tube constructed according to the principles of the present invention shown with the tube nut of FIG. 9 mounted therein.
Figure 21:
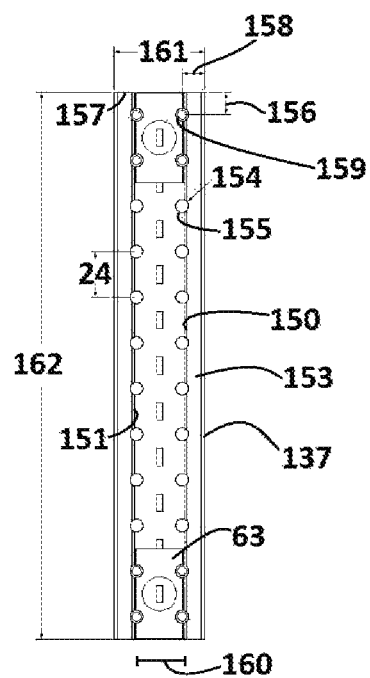
FIG. 21 a side elevation channel and tube nut assembly depicted in FIG. 12.

The combination of channel nut 63 and channel tube 137 to create a rigid framework can be more fully appreciated by reference to FIGS. 12, 16, 21, 22 and 26. FIG. 12 depicts a channel tube 137 in two channel nuts 63 have been placed. Prior to affixing any fasteners, the channel nuts 63 may be moved to by sliding with the channel tube 137 to any position at which the scalloped indentations 148, 149 align with the bores 64 and 65 of the nut 63. The planar surface 69 of the top shelf 79 fits between the edges 150 and 151 of the channel 137 such that a single, substantially continuous, flush planar surface is extends between edge surface 152 and the opposite edge surface 153. FIG. 21 depicts the dimensional characteristics of the channel and tube interaction. The distance 24 between adjacent bores can be considered a single equal unit of measure (EUM). The diameter 154 of each bore 155 is equal to 0.28 EUM, while the distance 156 between the edge 157 of channel 137 and the centerline 158 of the last bore 159 is 0.50 EUM. The width 160 of channel nut 63 is one EUM, while the width 161 of channel tube 137 is two EUMs. The overall length 162 of the channel tube 137 is an integral multiple of one EUM.

Figures 23, 26:
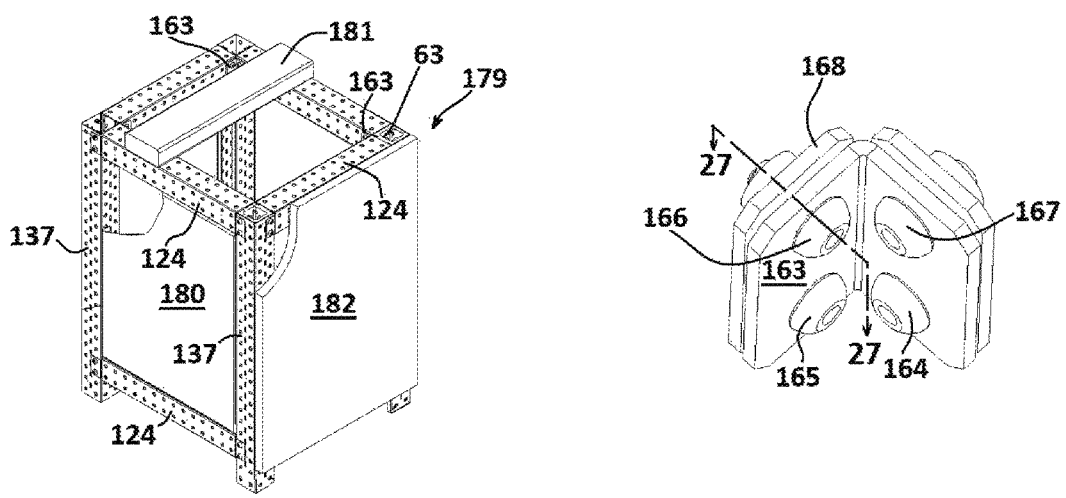
FIG. 23 is an isometric view of an exemplary framework constructed according to the principles of the present invention.
FIG. 26 is an isometric view of showing the combination of an angle bracket and fasteners constructed according to the principles of the present invention.

More complex joints may require the use of angle bracket to provide additional rigidity and absolute strength. FIG. 26 depicts an orthogonal angle bracket 163 as well as a plurality of threaded fasteners 164, 165, 166 and 167. Two separate threaded nut plates 168 and 169 are placed within the channel tube 137 and aligned with the threaded fasteners 164-167 to permit tightening the fasteners by use of a single tool that is exterior to the channel tube 137. FIGS. 16 and 22 depict a section of a completed framework in which the angle brackets 163 are utilized. Using two of the channel tubes 124 with flanges 132, 135, 134 and 131 as discussed earlier with reference to FIG. 15, multiple angle brackets 163 may be used to create a single joint supporting extensions in six different directions by means of a single tube nut 63. One of the nut plates 169 is visible inside the channel 110.

Figure 19:
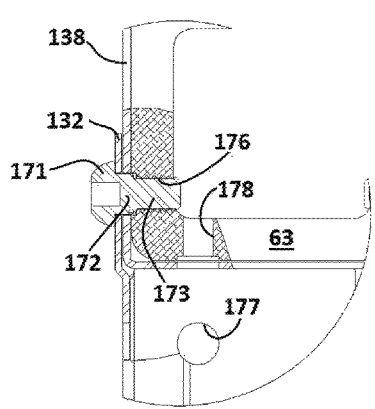
FIG. 19 is a cross sectional view taken along line 19-19 of FIG. 17.
Figure 20:
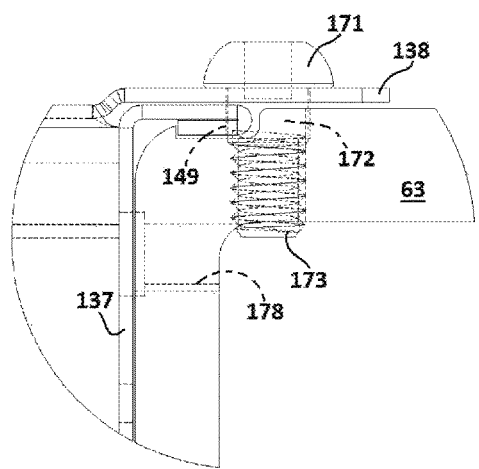
FIG. 20 is a detailed view of the region 20 depicted in FIG. 17.
Figure 27:
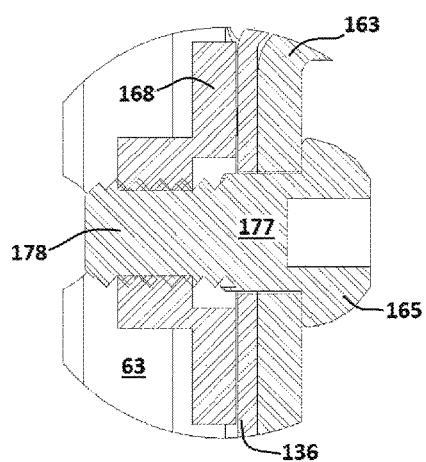
FIG. 27 is a partial sectional view taken along lines 27-27 of FIG. 26 with the addition of the channel tube sidewall and the channel nut.

Referring to FIGS. 17, 18, 19 and 20, the interaction of the fastener 170 with the tube nut 63 may be better understood. The fastener 170 includes a head 171, a solid shank 172 and a tapered thread portion 173. In the typical application depicted in FIG. 17, the fastener 170 is inserted through a bore the flange 135 which is part of the channel tube 124, through a hole 175 (visible in FIG. 12) in a channel 137 which does not have a flange, and finally through the threaded bore 75 in the channel nut 63. As seen in FIG. 19, the tapered thread 173 of the fastener 170 is inserted into the threaded bore 176 of the channel nut 63. The solid shank 172 transfers any shear force transmitted by either the flange 132 or the sidewall 138 of channel 137 through the fastener 170 and to the tube nut 63. FIG. 20 depicts the solid shank portion 172 of the threaded fastener 170 resting on the scalloped edge 149 of the channel tube 137 depicted in FIG. 12. FIG. 27 depicts the installed angle bracket 63 and tube nut 168. The solid shank portion 177 of the fastener 165 abuts the angle bracket 163 and the sidewall 136 of the channel tube. The threaded portion 178 of the fastener 165 engages the nut plate 168, thereby creating a strong joint that is displaced from the tube nut 63.

Figure 24:
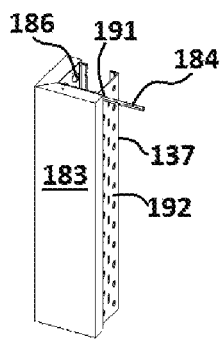
FIG. 24 is an isometric view of an assembly including a trim board fastened to a channel constructed according to the principles of the present invention.
Figure 25:
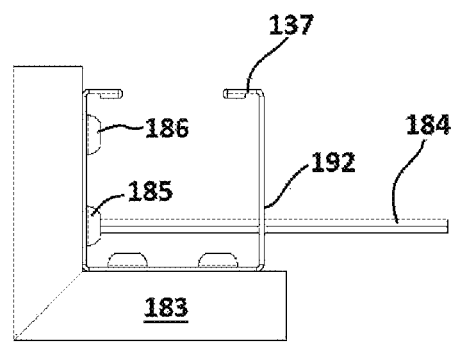
FIG. 25 is an end elevation view of the assembly depicted in FIG. 24.
Figure 28:
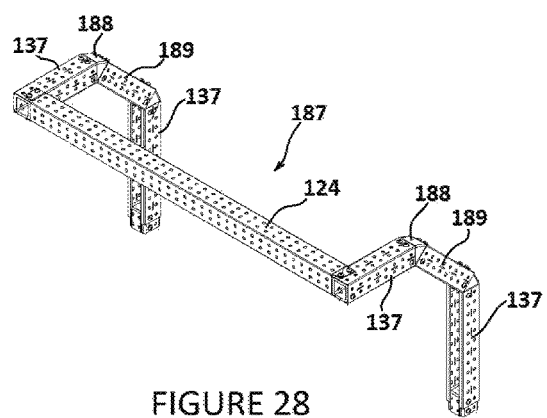
FIG. 28 is a second exemplary isometric view of a framework constructed according to the principles of the present invention.

Practical examples of the system described herein are depicted in FIGS. 23, 24, 25 and 28. A cubical framework 179 is shown in FIG. 23. Channels 124 and 137 are utilized along with angle brackets 163 to create a table or bench. Panels 180, 181 and 182 are used to conceal the framework 179 and present a continuous, smooth working surface. FIGS. 24 and 25 depict a trim board 183 that is applied to a channel 137. An extension bit 184 permits access to interior fasteners 185 and 186 via an aligned bore 191 on the outer sidewall 192. FIG. 28 depicts a custom shaped framework 187 that includes various additional elements 188 and 189 that are readily utilized by imitating the bore pattern found on the channels 124 and 137. Anchor points for additional elements are provided by the extension of the tube nuts 63. In this manner a very wide variety of framework can be constructed with a very few elements and tools. While the system and components have been described to disclose the preferred embodiments of the present invention, those skilled in this field of endeavor will appreciate that many obvious modifications may be made to specific dimensions and shapes while still remaining within the scope of the invention.

We claim:

1. A structural assembly comprising:
   a channel tube formed to include three planar, adjoining sidewalls thereby creating a substantially open side, the channel tube comprising:
   at least one inner protrusion extending from at least one sidewall toward the substantially open side; and
   a plurality of perforations, the perforations residing on each sidewall, the perforations having a size and spacing so as to form a substantially identical pattern of perforations on each sidewall of the channel tube; and
   a channel nut, the channel nut being formed as a substantially rectangular open solid having four substantially identical, adjoining edge regions, each edge region being shaped and sized to engage one of the inner protrusions of the channel tube such that at least two of the substantially identical edge regions are slidable along opposite sidewalls of the channel tube to permit placement of the channel nut at a desired location, each channel nut including at least one bore adapted to receive a fastener passing through a perforation of the channel tube.

2. The structural assembly of claim 1, wherein the channel nut further comprises a shelf region, the shelf region residing between the two opposite sidewalls of the channel tube.

3. The structural assembly of claim 2, wherein the shelf region further comprises:
   (a) a planar region;
   (b) a wall region;
   (c) a radial outer corner, the radial outer corner interconnecting the planar region and the wall region; and
   (d) a filleted inner corner, the filleted inner corner interconnecting the wall region and one of the edge regions of the channel nut.

4. The structural assembly of claim 3, wherein the edge regions of the channel nut span substantially an entire longitudinal length of the substantially rectangular open solid.

5. The structural assembly of claim 4, wherein the edge regions are formed as a radial surface interconnecting adjacent orthogonal surfaces of the substantially rectangular open solid.

6. The structural assembly of claim 5, wherein at least one bore of the channel nut is threaded so as to mate with a suitably dimensioned threaded fastener.

7. The structural assembly of claim 6, wherein the channel nut further comprises a substantially rectangular central cavity, the cavity abutting each bore formed within the channel nut.

8. The structural assembly of claim 7, wherein the channel nut further comprises a plurality of bores formed within the shelf region, each bore having a longitudinal axis that is substantially orthogonal to a sidewall of the channel tube.

9. The structural assembly of claim 8, wherein the channel nut is formed to include an opposite outer sidewall, the opposite outer sidewall residing in a substantially opposed, spaced apart coplanar relationship to the shelf region, the opposite outer sidewall being formed to include a plurality of bores in an aligned relationship to the plurality of bores formed within the shelf region.

10. The structural assembly of claim 9, wherein the channel nut is formed to include two opposing sidewalls, each of the two opposing sidewalls being substantially orthogonal to the shelf region and the opposite outer sidewall.

11. The structural assembly of claim 10, wherein the channel nut further comprises a cantilevered flange, the cantilevered flange extending outwardly from the shelf region, the cantilevered flange being substantially coplanar with one of the opposing sidewalls of the channel nut.

12. The structural assembly of claim 11, wherein the cantilevered flange is formed to include at least one perforation, each perforation being substantially identical to and substantially parallel with bores formed within the opposing sidewalls of the channel nut.

13. The structural assembly of claim 10, wherein each of the two opposing sidewalls is formed to include a plurality of bores, the bores being substantially orthogonal to bores formed within the shelf region.

14. A method of constructing a framework, comprising the steps of:
(a) forming a channel, the channel having three substantially similar, planar orthogonal sides, thereby creating an open, substantially vacant side, the channel having a substantially constant cross sectional profile;
(b) forming a plurality of bores within each of the substantially similar, planar orthogonal sides, the plurality of bores being arranged in a substantially identical symmetrical pattern;
(c) forming a channel nut having an external shape and dimensions so as to permit the 20 channel nut to substantially fill the cross sectional profile upon insertion of the channel nut into the channel;
(d) forming the channel nut to have a raised region so as to create a flush planar surface within the substantially vacant side of the channel;
(e) forming the channel nut to have four planar surfaces;
(f) forming a plurality of bores within each of the four planar surface of the channel nut, the bores being formed in a pattern that is substantially similar to at least a portion of the substantially identical symmetrical pattern of bores formed within each of the substantially similar, planar orthogonal sides of the channel;
(g) orienting a plurality of channels so as to create overlapping, aligned bores;
(h) inserting at least one channel nut into at least one of the plurality of channels so as to cause bores within the channel nut to be aligned with the overlapping, aligned bores of the plurality of channels;
(i) inserting a threaded fastener into each of the overlapping, aligned bores; and
(j) securing each threaded fastener to the channel nut so as to create a rigid bond between the plurality of channels and the channel nut.

* * * * *